(12) United States Patent
Bugiel et al.

(10) Patent No.: US 8,201,502 B2
(45) Date of Patent: Jun. 19, 2012

(54) MAGNET POLE FOR MAGNETIC LEVITATION VEHICLES

(75) Inventors: Peter Bugiel, Fuldabrück (DE); Harald Pfannkuch, Wabern (DE); Wolfgang Hahn, Kassel (DE); Qinghua Zheng, Taufkirchen (DE)

(73) Assignee: ThyssenKrupp Transrapid GmbH, Kassel (DE)

( * ) Notice: Subject to any disclaimer, the term of this patent is extended or adjusted under 35 U.S.C. 154(b) by 263 days.

(21) Appl. No.: 12/444,932

(22) PCT Filed: Sep. 5, 2007

(86) PCT No.: PCT/DE2007/001577
§ 371 (c)(1),
(2), (4) Date: Apr. 9, 2009

(87) PCT Pub. No.: WO2008/043328
PCT Pub. Date: Apr. 17, 2008

(65) Prior Publication Data
US 2010/0024678 A1 Feb. 4, 2010

(30) Foreign Application Priority Data
Oct. 12, 2006 (DE) .......................... 10 2006 049 716

(51) Int. Cl.
*B60L 13/06* (2006.01)
(52) U.S. Cl. ......... 104/286; 104/281; 335/296; 335/297
(58) Field of Classification Search .......... 104/281–286, 104/292, 294
See application file for complete search history.

(56) References Cited

U.S. PATENT DOCUMENTS

| | | | | |
|---|---|---|---|---|
| 3,467,931 A * | 9/1969 | Dutton | ........................... | 336/180 |
| 3,593,243 A * | 7/1971 | Trump et al. | .................... | 336/60 |
| 4,086,552 A * | 4/1978 | Baggermans | ................. | 336/119 |
| 5,274,904 A * | 1/1994 | Proise | .......................... | 29/602.1 |
| 5,530,308 A * | 6/1996 | Fanning et al. | ............... | 310/208 |
| 7,634,249 B2 * | 12/2009 | Hahn et al. | .................... | 455/403 |
| 7,724,120 B2 * | 5/2010 | Hahn et al. | .................... | 336/234 |
| 7,855,628 B2 * | 12/2010 | Hahn et al. | .................... | 336/206 |
| 2001/0001895 A1 * | 5/2001 | Setiabudi et al. | ................ | 29/609 |
| 2004/0085177 A1 * | 5/2004 | Razzell et al. | ................ | 336/234 |
| 2008/0143467 A1 * | 6/2008 | Hahn et al. | .................... | 336/185 |
| 2009/0021335 A1 * | 1/2009 | Hahn et al. | .................... | 335/297 |
| 2009/0174511 A1 * | 7/2009 | Hahn et al. | .................... | 335/296 |
| 2010/0024678 A1 * | 2/2010 | Bugiel et al. | ................... | 104/286 |
| 2010/0026443 A1 * | 2/2010 | Yan et al. | ....................... | 336/234 |

FOREIGN PATENT DOCUMENTS

| | | |
|---|---|---|
| DE | 102004011940 | 8/2005 |
| DE | 10204011942 | 9/2005 |
| DE | WO 2005/087533 | 9/2005 |
| DE | WO 2005/087534 | 9/2005 |
| JP | 06-290933 | 10/1994 |

* cited by examiner

*Primary Examiner* — S. Joseph Morano
*Assistant Examiner* — Jason C Smith
(74) *Attorney, Agent, or Firm* — McGlew and Tuttle, P.C.

(57) ABSTRACT

A magnet pole, for magnetically levitated vehicles, includes a core (10) and a winding provided with winding disks that are arranged axially on top of each other. Both of the disks contain conduction band sections (6a, 6b) that are wound counter to the direction of winding and in several layers about the core (10). The conduction band sections are connected together in an electrically conductive manner by means of a connection part (1) on the core (10) near ends. The connection part (1) is bent in an outward manner on lateral longitudinal edges that are parallel to each other thus forming a curved outlet (12a, 12b).

19 Claims, 5 Drawing Sheets

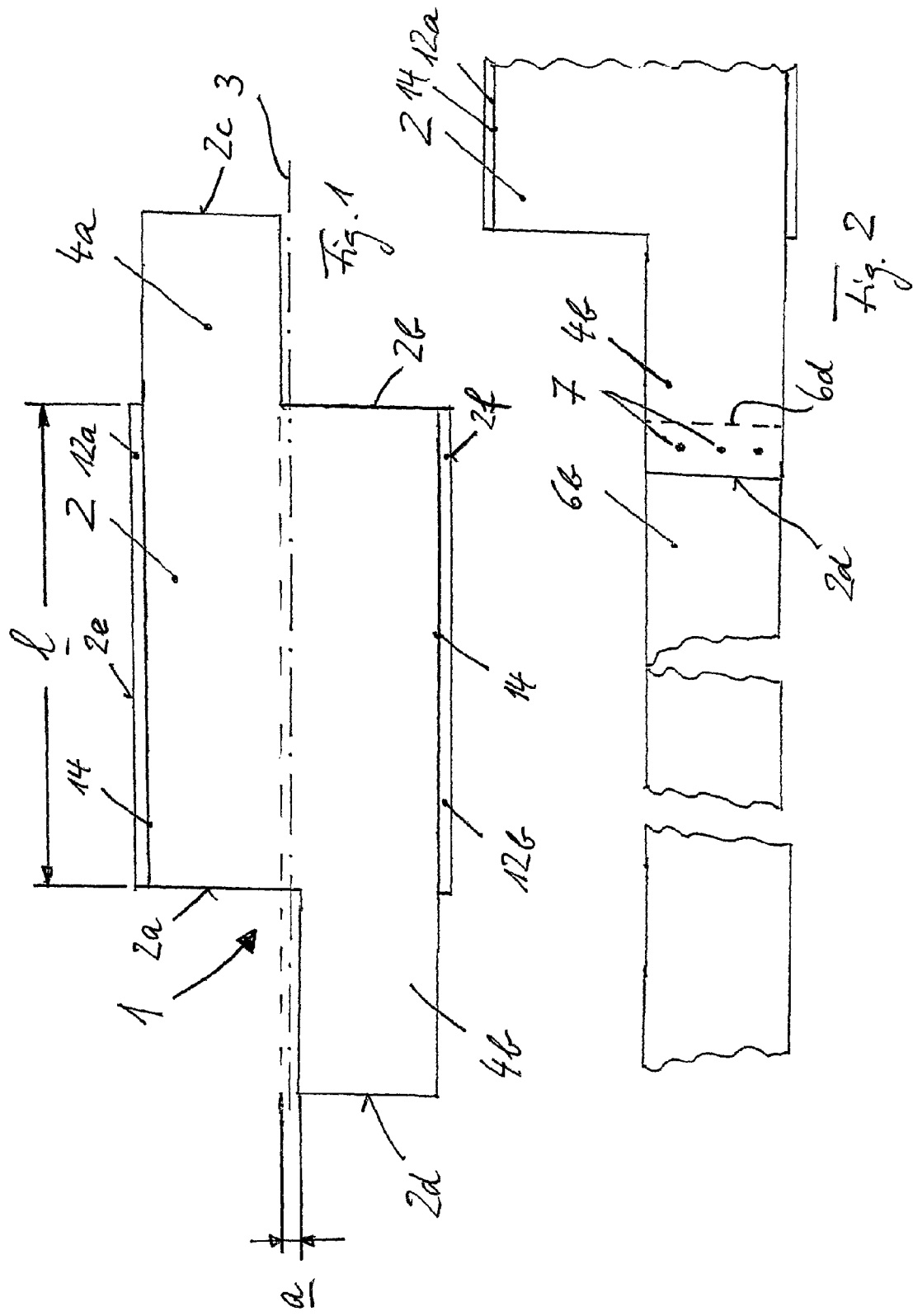

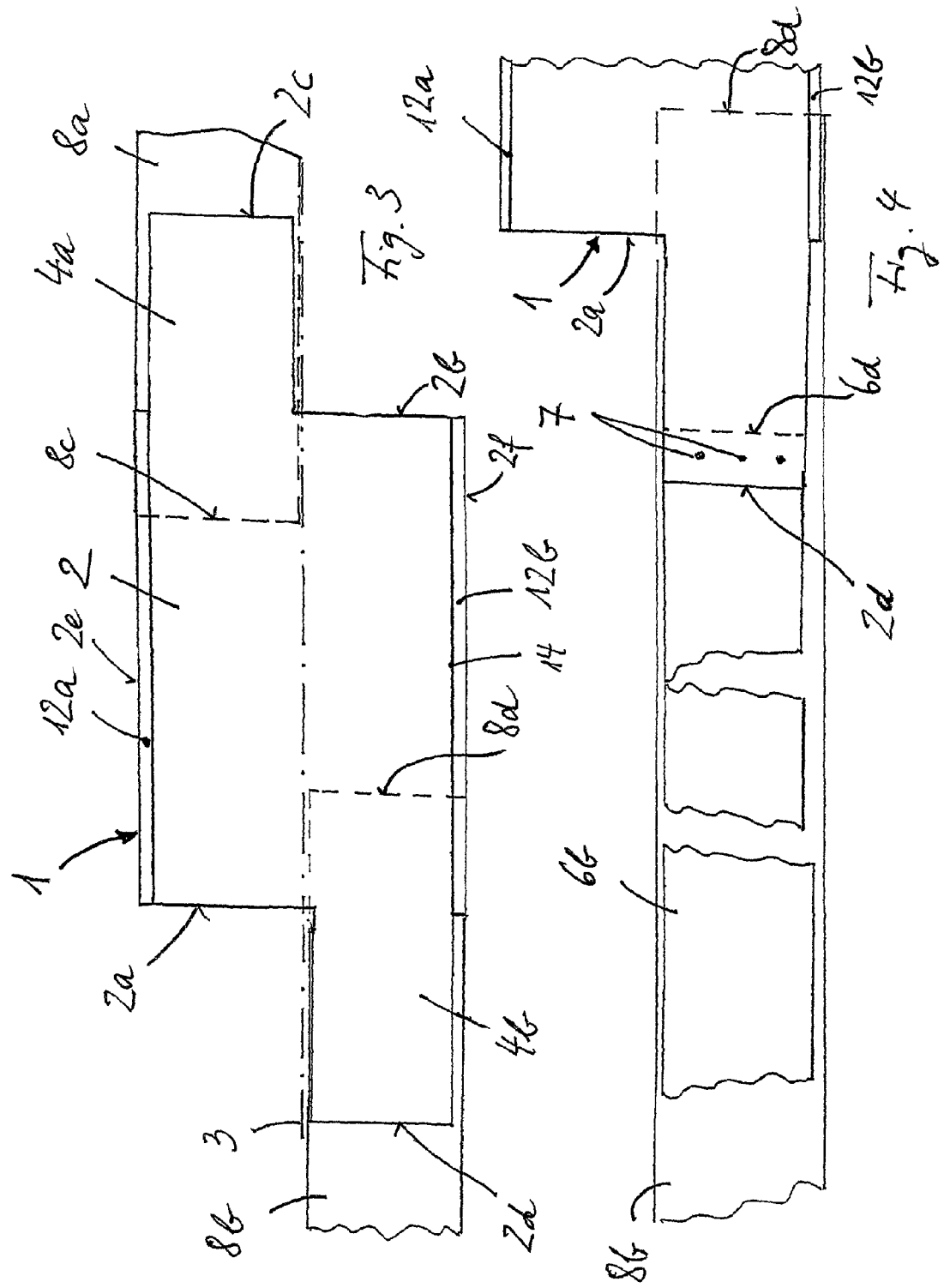

US 8,201,502 B2

MAGNET POLE FOR MAGNETIC LEVITATION VEHICLES

CROSS REFERENCE TO RELATED APPLICATIONS

This application is a United States National Phase application of International Application PCT/DE2007/001577 and claims the benefit of priority under 35 U.S.C. §119 of German Patent DE 10 2006 049 716.3 filed Oct. 12, 2006, the entire contents of which are incorporated herein by reference.

FIELD OF THE INVENTION

The present invention pertains to a magnet pole for magnetic levitation vehicles with a core and with a winding, which is wound on same and has two disks located one on top of another, wherein the two disks contain two conduction band sections, which are wound around the core and are connected to one another in an electrically conductive manner by a middle connecting part forming a first layer on the core at ends located close to the core.

BACKGROUND OF THE INVENTION

Magnet poles of this type are used in many different forms in magnetic levitation vehicles, e.g., as parts of carrier, guide or brake magnets. To reduce cooling and insulation problems, they contain at least two disks, which are located at spaced locations from one another in the axial direction of the core and are insulated by suitable insulation layers against each other and against the core (DE 10 2004 011 940 A1). It is advantageous for electrical reasons to connect the two disks to one another electrically in an area close to the core, because this eliminates the need for arranging electrical terminals led through inwardly and terminating between the core and the first layer. Magnet poles of the class described in the introduction are therefore also known (DE 10 2004 011 942 A1), which make possible a cost-effective connection between the two disks in the area of the core, which said connection can be established without complicated insulation measures.

It was observed during the practical use of such magnet poles that the insulation of the disks against the core is not yet satisfactory. Electric breakdowns, which destroy the insulation, may occur when thin insulation layers are used in the area of the core, which would be favorable for heat dissipation over the core acting as a cooling body. By contrast, the cooling action is reduced if thick insulation layers are used, which reliably prevent electric breakdowns.

SUMMARY OF THE INVENTION

Based on this, the basic technical object of the present invention is to design the magnet pole of the class described in the introduction such that no harmful potential increases leading to electric breakdowns will occur even when a comparatively thin insulation layer surrounding the core is used.

According to the invention, a magnet pole is provided for magnetic levitation vehicles with a core and with a winding, which is wound on same and has two disks located one on top of another, wherein the two disks contain two conduction band sections, which are wound around the core in opposite winding directions and in a plurality of layers and are connected to one another in an electrically conductive manner by a middle connecting part forming a first layer on the core at ends located close to the core. The connecting part is bent over to the outside at mutually parallel, lateral longitudinal edges, forming an arc-shaped end each.

The present invention is based on the assumption that at least part of the harmful potential increases is caused by the lateral edges of the first layer formed by the connecting part. By contrast, it is achieved by the bent-off edges of the connecting part according to the present invention that no harmful peak discharges will occur any more in the edge areas and the insulation layer is not therefore stressed more at its axial edges than in the middle parts of the core. It is therefore possible to use thin insulating films throughout, which has a favorable effect on heat dissipation.

The connecting part may advantageously have two terminal ends which set the distance between the two disks and are connected to one of the conduction band sections each.

The arc-shaped ends may have a somewhat greater length in the circumferential direction of the core than would correspond to the circumference of the core and may be placed with an overlap at the ends facing each other.

The connecting part may advantageously be an essentially rectangular, flat shaped part, which has one of the terminal ends each at ends located opposite.

The overlap of the arc-shaped ends may be obtained by an oblique cut of end edges of the connecting part, which end edges adjoin the end sections.

The present invention will be explained in more detail below in connection with the attached drawings on the basis exemplary embodiments. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a top view of a first exemplary embodiment of a connecting part according to the present invention, which is suitable for connecting two disks intended for the winding of a magnet pole;

FIG. 2 is a top view of a detail of the connecting part according to FIG. 1 with a conduction band section fastened to this for a first disk of a winding;

FIG. 3 is a top view of the connecting part, which view corresponds to FIG. 1, but with an insulating film placed on this connecting part;

FIG. 4 is a top view corresponding to FIG. 2, but with an additionally inserted insulating film corresponding to FIG. 3;

DESCRIPTION OF THE PREFERRED EMBODIMENTS

Figure 5:
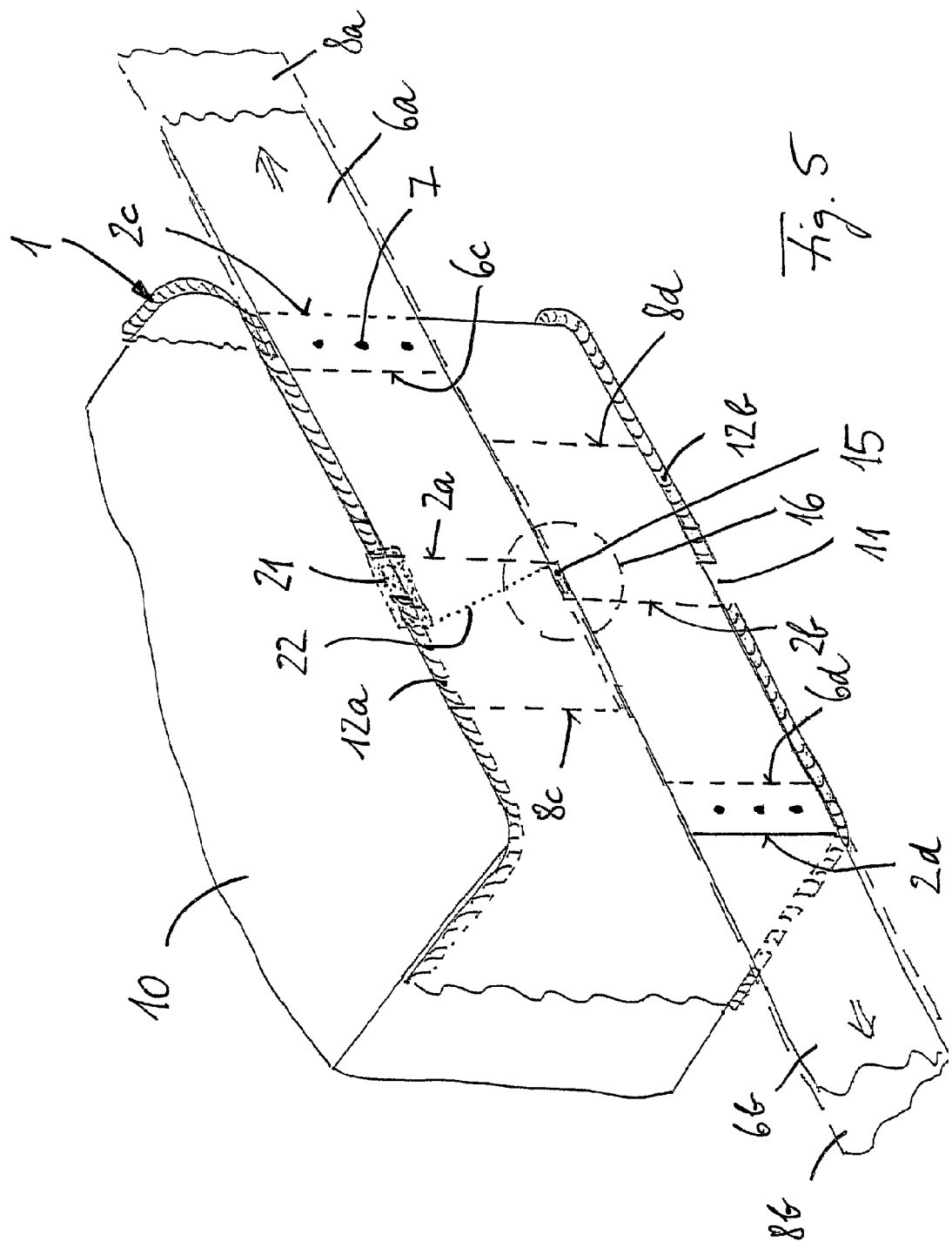
FIG. 5 is a schematic and perspective partial view of the connecting part according to FIGS. 1 through 4 in the area of a butt joint.

Referring to the drawings in particular, Magnet poles that have a core and windings consisting of two disks are generally known. These two disks are located one on top of another in the axial direction of an axis of the core and preferably have the same number of layers. These are electrically insulated against one another by insulating films, on the one hand, and against the core by an additional insulating layer, on the other hand. In addition, the layers of one disk are preferably wound around the core in an opposite winding direction compared to the other disk. The disks are electrically connected to one another by a connecting part at their layers located innermost.

According to FIG. 1, such a connecting part 1 intended for connecting two disks of a winding has a middle section 2 with a central or longitudinal axis 3 and with a width that corresponds essentially to the height of a core, not shown, and is measured at right angles to the longitudinal axis 3. The middle section 2 ends at end edges 2a and 2b each extending at right angles to the longitudinal axis 3. In addition, the middle section 2 has a first terminal end 4a at the right end according to FIG. 1 and in its upper half according to FIG. 1 and a second terminal end 4b at its left-hand end and in its lower half in FIG. 1. Both terminal ends 4a, 4b are of a strip-shaped design, directed opposite each other, extend beyond the corresponding end edge 2a, 2b and in parallel to the longitudinal axis 3 and are somewhat less wide than half the width of the middle section 2.

The terminal ends 4a, 4b, corresponding to FIG. 1, at end edges 2c and 2d extending at right angles to the longitudinal axis 3 and are used in the known manner to connect a line band section each. This is shown in FIG. 2 on the basis of a line band section 6b connected to the terminal end 4b. It is clear that the other terminal end 4a is connected to a corresponding line band section 6a (e.g., FIG. 5).

The connecting part 1 and the conduction band sections 6a, 6b consist of a material with good conductivity, e.g., aluminum, and are preferably connected to one another by welding. This is indicated in FIG. 2 by weld points 7, which are formed in short overlapping areas between the terminal ends 4a, 4b and the conduction band sections 6a, 6b. Broken lines 6c and 6d (cf. FIG. 5) indicate the end edges of the conduction band sections 6a, 6b, which said end edges end at the connecting part 1. Since FIGS. 1 and 2 show a top view of a surface of the connecting part 1 facing away from the core, the broken lines 6c, 6d indicate, furthermore, that the conduction band sections 6a, 6b in FIGS. 1 through 5 are located under the terminal ends 4a, 4b.

The two terminal ends 4a, 4b and consequently also the conduction band sections 6a, 6b connected to them are located at right angles to the longitudinal axis 3 at a distance a (FIG. 1) that corresponds to the distance between the two disks in the finished state of the winding. The distance between the disks is therefore defined unambiguously by the design of the connecting part 1.

In the direction of the longitudinal axis 3 the middle section 2 has a length l (FIG. 1) measured between the two end edges 2a, 2b, which is preferably equal to the circumference of the wound-over core after application of the insulating layer surrounding it.

FIGS. 3 and 4 show that a strip-shaped insulating film 8a and 8b each also comes to lie under the conduction band sections 6a, 6b and the corresponding terminal ends 4a, 4b. In particular, FIG. 3 shows only the respective terminal ends 4a and 4b and the insulating films 8a and 8b, which end on the side of the middle section 2 at end edges 8c, 8d indicated by broken lines. By contrast, FIG. 4 also shows, in addition to the left-hand insulating film 8b, the conduction band section 6b connected to the terminal end 4b analogously to FIG. 2. The insulating films 8a and 8b are used to mutually insulate the layers of the winding to be prepared with the conduction band sections 6a, 6b, on the one hand, and to insulate the end sections thereof against the connecting part 1, on the other hand. The end edges 8c, 8d of the insulating films 8a, 8b are located for this reason farther inwardly in the middle section 2 compared to the end edges 6c, 6d of the conduction band sections 6a, 6b.

FIG. 5 schematically shows the winding of a core 10 with the winding according to FIGS. 1 through 4. The middle section 2 is placed first on the core 10 for this purpose and wound once around this. The terminal ends 4a, 4b begin in the area of a joint site 11 or of a narrow gap between the two end edges 2a, 2b of the middle section 2, which said gap is shown as an exaggeratedly large gap in FIG. 5, and the conduction band sections 6a and 6b connected to these terminal ends begin somewhat farther on the outside, while the insulating films 8a, 8b inserted end closer to the gap 11 and overlap the gap area. It can be clearly recognized from FIG. 5 that the connecting part 1 also sets, based on the described design, that the conduction band section 6a is to be wound counterclockwise and the conduction band section 6b clockwise around the core 10, i.e., the connecting part 1 sets not only the distance a (FIG. 1) but also the direction of winding of the two conduction band sections 6a, 6b.

Magnet poles of this type are known, e.g., from DE 10 2004 011 940 A1 (corresponding to US2008143467) and DE 10 2004 011 942 A1 (corresponding to US2009021335). Reference is therefore made to these documents to avoid repetitions of further details, and these are hereby made the subject of the present disclosure by reference (corresponding U.S. patent applications US2008143467 and US2009021335 are hereby incorporated by reference). Only the features of such magnet poles that are essential for the present invention will be explained in more detail below.

According to the present invention, the middle section 2 of the connecting part 1 has two lateral longitudinal edges 2e and 2f, which extend in parallel to the longitudinal axis 3 and are bent over to the outside, forming arc-shaped ends 12a, 12b. The ends 12a, 12b are limited in FIGS. 1 through 4 by lines 14 extending in parallel to the longitudinal axis 3 and are indicated above all in FIG. 5 by areas drawn in broken lines. The ends 12a, 12b extend, like the middle section 2, over a length that corresponds essentially to the circumference of core 10. Therefore, the ends 12a, 12b end likewise, as is shown in the lower part of FIG. 5, at the gap 11.

As is also shown in FIGS. 1 through 4, the connecting part 2 ends at the respective end edges 2a and 2b extending at right angles to the longitudinal axis 3. Since, moreover, the distance a is present between the terminal ends 4a, 4b, an open slot 15, which is not covered either by the terminal ends 4a and 4b or by the conduction band sections 6a and 6b and the insulating films 8a, 8b, is formed after the core 10 has been wound around in the area of the joint site 11. This slot 15 is needed, however, for avoiding mutual contacts between the two terminal ends 4a, 4b and hence electric breakdowns. In order to nevertheless avoid undesired potential increases in this area, slot 15 is advantageously covered with a partially conductive film 16, which lies on the insulating layer of the core 10 and is schematically indicated by a circle drawn in broken line in FIG. 5. The partially conductive film 16 consists, e.g., of an organic insulating material mixed with carbon black and is suitable for draining off capacitive currents without letting through operating currents. The risk of peak discharges in this area is further reduced hereby.

Figure 6:
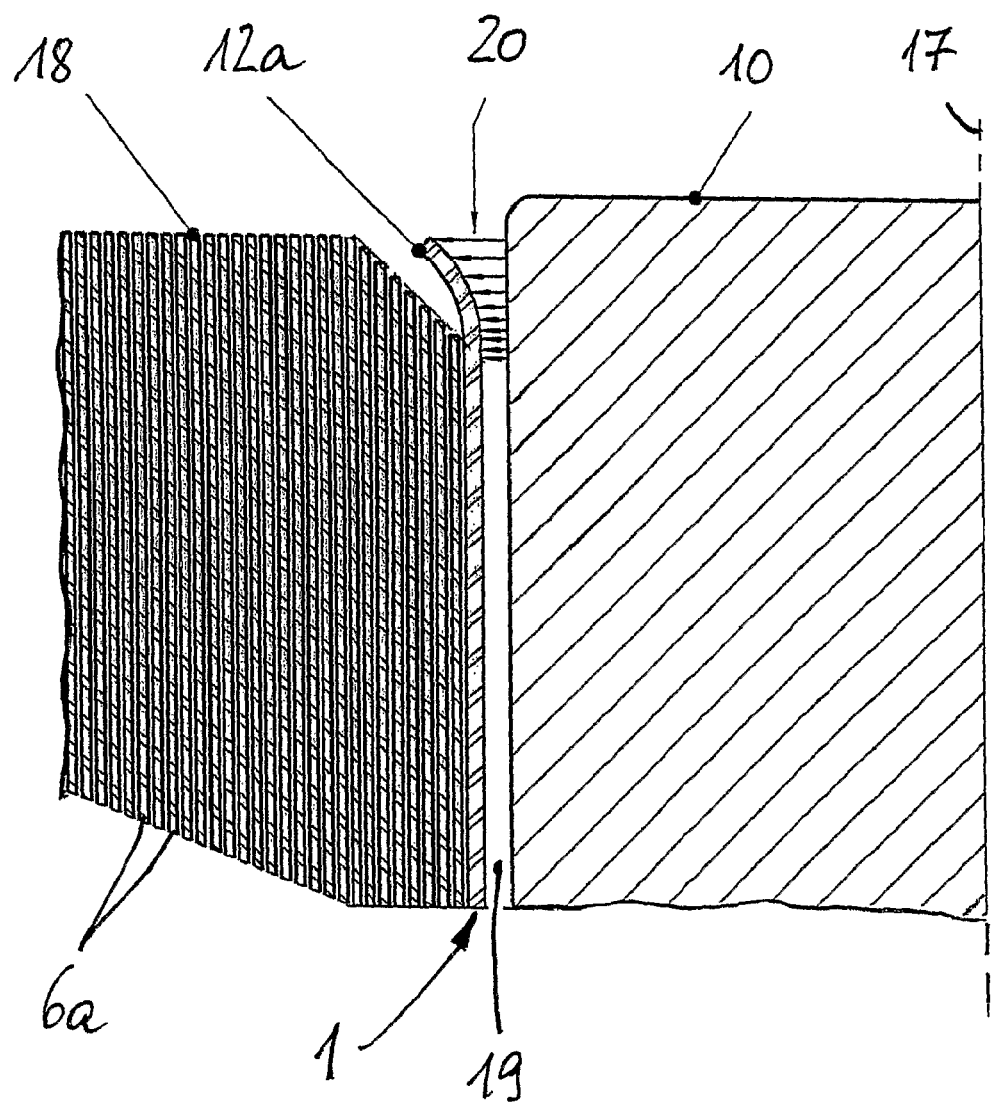
FIG. 6 is a schematic sectional view through a magnet pole with a winding prepared corresponding to FIGS. 1 through 5.

FIG. 6 shows a partial cross section through a magnet pole, which has the core according to FIG. 5, a central axis 17 and a disk 18 of a winding, which said disk is shown only partially. Core 10 is surrounded at first by an insulating layer 19, on which the connecting part 1 is wound corresponding to FIGS.

1 through 5. Clearly visible here is the upper end 12a, which has an arc-shaped course and ends approximately at the level of the upper longitudinal edge of the conduction band section 6a forming the disk 18 or even somewhat above it. Arrows 20 in FIG. 6 indicate that the core 10 and the connecting part 1 form the two electrodes of a plate capacitor, which has an essentially constant plate distance in an area located between the ends 12a, 12b (FIG. 5), so that a homogeneous electrical field develops there during the operation of the magnet pole. The two ends 12a and 12b ensure according to the present invention at the upper and lower edges of this plate capacitor that the electrical field is not increased there by edge effects, but is rather decreased continuously. This leads to the advantage, described in the introduction, that the insulation layer 19 is not exposed to higher stresses at the lateral edges than in the inner, homogeneous part.

Figure 7:
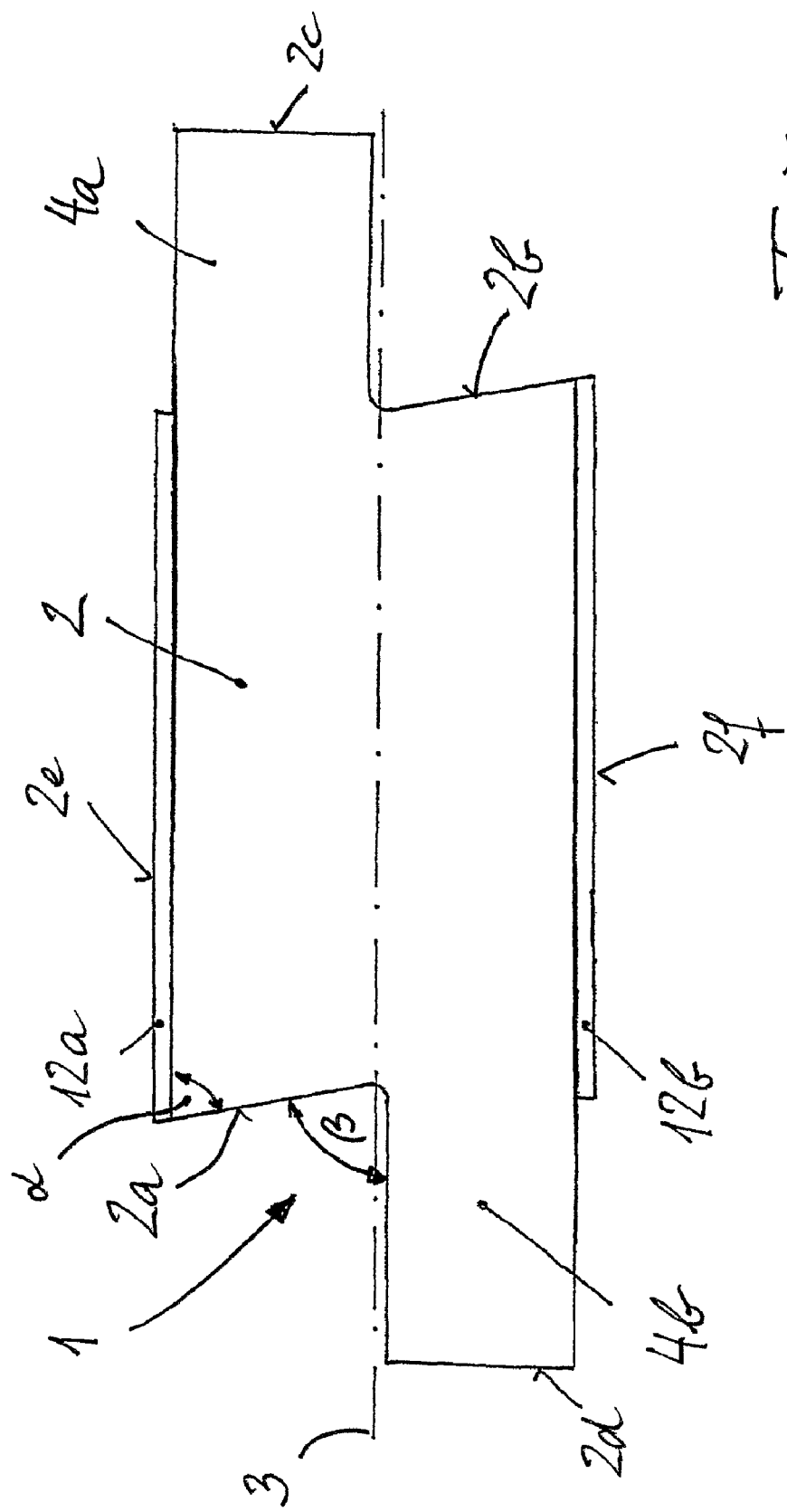
FIG. 7 is a top view of a second exemplary embodiment of the connecting part according to the present invention, which top view corresponds to FIG. 1.

A further reduction of the stress on the insulation layer 19 during operation is achieved according to the present invention by an oblique cut of the end edges 2a and 2b, as it is shown in FIG. 7 on the basis of the exemplary embodiment of the connecting part 1 according to the present invention that is currently considered to be the best. The end edges 2a, 2b are beveled, starting from the longitudinal edges 2e and 2f, especially towards the center of the middle section 2, so that they form an acute angle α with the end edges 2e, 2f and end at the corresponding terminal ends 4a, 4b, forming corresponding acute angles β. In particular, the arrangement is selected to be such that the ends 12a, 12b are located closer opposite each other after the core 10 has been wound around according to FIG. 5 than the gap 11 shown in FIG. 5. In addition, the two end edges 2a and 2b extend here to the outside, starting from a smallest possible slot 15, obliquely rather than at right angles to the longitudinal axis 3. Based on this design of the end edges 2a, 2b, it is even possible to place the two ends 12a, 12b with a preselected overlap 21 indicated schematically in FIG. 5 for the end 12a in the area of gap 11, and a dotted line 22 is to indicate the end edge 2a extending obliquely here. At the same time, the insulating films 8a and 8b can be used in this case to electrically insulate the two overlapped parts in order to avoid short-circuits in this area. On the whole, it is achieved by the measures described on the basis of FIG. 7, which are taken preferably in addition to the partially conductive film 16, that the insulating layer 19 (FIG. 6) will not be stressed excessively by potential increases inevitably occurring in the area of gap 11 and of slot 15.

The present invention is not limited to the exemplary embodiments described, which can be varied in many different ways. This applies especially to the shape of the connecting part 1 selected in the particular case, which may comprise, e.g., a shaped part prepared by punching. The ends 12a, 12b may also be prepared, in principle, as desired. It is advantageous for the purposes of the present invention to prepare the bent parts by cold working of the edge areas of the connecting part 1 in a compression mold or the like. The radii of curvature in the area of the bent parts are to be selected depending on the particular case. Furthermore, the potential increases can be reduced in an area close to the core 10 by imparting a gradually increasing width on the conduction band sections 6a and 6b starting from the terminal ends 4a and 4b, as this is indicated in FIGS. 2 and 4 at the left-hand end of the conduction band section 6b. The edges of the layers located innermost are flatly covered as a result in the area of the ends 12a, 12b of the finished winding by additional layers located farther to the outside (cf. FIG. 6), as this was already described, in principle, e.g., in DE 10 2004 011 941 A1 and DE 10 2004 011 942 A1. Furthermore, it is possible to form the magnet pole in an analogous design from more than two disks located one on top of another in the direction of the axis of the core 10. Finally, it is obvious that the different features may also be used in combinations other than those described and shown.

While specific embodiments of the invention have been shown and described in detail to illustrate the application of the principles of the invention, it will be understood that the invention may be embodied otherwise without departing from such principles.

The invention claimed is:

1. A magnet pole for magnetic levitation vehicles the magnet pole comprising:
    a core;
    a winding, which is wound on the core and comprises two disks located one on top of another, wherein the two disks contain two conduction band sections wound around the core in opposite winding directions and in a plurality of layers; and
    a middle connecting part forming a first layer on the core at ends located close to the core, the two conduction band sections being connected to one another in an electrically conductive manner by the middle connecting part forming the first layer on the core at ends located close to the core, wherein the connecting part is bent over to the outside at mutually parallel, lateral longitudinal edges to form bent edge portions, each of said bent edge portions forming an arc-shaped end, said bent edge portions extending in a radially outward direction from said core with respect to a central axis of said core.

2. A magnet pole in accordance with claim 1, wherein the connecting part has two terminal ends, which set the distance between the two disks and are connected to one of the conduction band sections each.

3. A magnet pole in accordance with claim 2, wherein the connecting part is an essentially rectangular, flat shaped part, which has one of the terminal ends each located at opposite ends.

4. A magnet pole in accordance with claim 1, wherein the arc-shaped ends have a somewhat greater length in the circumferential direction of the core than would correspond to the circumference of the core and are placed with an overlap at the ends facing each other.

5. A magnet pole in accordance with claim 4, wherein the overlap of the arc-shaped ends is obtained by an oblique cut of end edges of the connecting part, which said end edges adjoin the end sections.

6. A magnet pole in accordance with claim 1, wherein said lateral longitudinal edges are perpendicular to the central axis of said core.

7. A magnet pole in accordance with claim 1, wherein each of said bent edge portions is arranged at an angle relative to a central axis of said core.

8. A magnet pole for magnetic levitation vehicles the magnet pole comprising:
    a magnet core;
    a winding arrangement comprising two conduction band sections wound around the core in opposite winding directions and in a plurality of layers;
    a middle connecting part between said magnet core and said two conduction band sections to form a first layer on the core, said middle connecting part connecting said two conduction band sections to one another in an electrically conductive manner, wherein said connecting part comprises two arc-shaped ends extending radially outwardly from said core, each of said two arc-shaped ends comprising a bent portion, said bent portion being bent at an angle relative to a central axis of said core.

9. A magnet pole in accordance with claim 8, wherein the connecting part has two terminal ends, which set a distance between the two conduction band sections, each of said two terminal ends being connected to one of said conduction band sections.

10. A magnet pole in accordance with claim 8, wherein said arc-shaped ends have a greater length in a circumferential direction of said core than a corresponding circumferential length of said core and said arc-shaped ends having overlapping circumferential ends.

11. A magnet pole in accordance with claim 10, wherein the overlap of said arc-shaped ends is obtained by an oblique cut of an end edge of said connecting part, which each said end edge adjoins the end sections.

12. A magnet pole in accordance with claim 8, wherein said connecting part is an essentially rectangular flat shaped part that is wrapped about said core and which has a terminal end located at opposite circumferential ends.

13. A magnet pole for magnetic levitation vehicles the magnet pole comprising:
    a magnet core;
    a winding arrangement comprising two conduction band sections wound around the core in opposite winding directions and in a plurality of layers; and
    a middle connecting part between said magnet core and said two conduction band sections to form a first layer on the core, said middle connecting part connecting said two conduction band sections to one another in an electrically conductive manner, wherein said middle connecting part comprises a middle connecting portion and two arc-shaped ends, said middle connection portion being connected to said two arc-shaped ends, each of said two arc-shaped ends extending radially outwardly from said core with respect to a central axis of said core, wherein a distance between said core and said two arc-shaped ends is greater than a distance between said core and said middle connecting portion.

14. A magnet pole in accordance with claim 13, wherein the connecting part has two terminal ends, which set a distance between the two conduction band sections, each of said two terminal ends being connected to one of said conduction band sections.

15. A magnet pole in accordance with claim 14, wherein said connecting part is an essentially rectangular flat shaped part that is wrapped about said core and which has a terminal end located at opposite circumferential ends.

16. A magnet pole in accordance with claim 14, wherein the overlap of said arc-shaped ends is obtained by an oblique cut of an end edge of said connecting part, which each said end edge adjoins the end sections.

17. A magnet pole in accordance with claim 14, wherein each of said two arc-shaped ends comprise a bent portion, said bent portion being bent at an angle relative to a central axis of said core, said bent portion facing in a radial outward direction with respect to said central axis of said core.

18. A magnet pole in accordance with claim 14, wherein said middle connecting portion is substantially parallel to the central axis of said core.

19. A magnet pole in accordance with claim 13, wherein said arc-shaped ends have a greater length in a circumferential direction of said core than a corresponding circumferential length of said core and said arc-shaped ends having overlapping circumferential ends.

* * * * *